United States Patent [19]

Kravig et al.

[11] 4,343,850
[45] Aug. 10, 1982

[54] DECORATED LAMINATE HAVING INDICIA APPLIED PHOTOELECTROGRAPHICALLY AND METHOD OF MAKING SAME

[75] Inventors: Hal C. Kravig, Bartlett; John T. Van Drie, Memphis, both of Tenn.

[73] Assignee: The Vollrath Company, Sheboygan, Wis.

[21] Appl. No.: 132,614

[22] Filed: Mar. 21, 1980

[51] Int. Cl.³ .......................... B32B 3/00; B32B 23/08
[52] U.S. Cl. .................................... 428/203; 156/222; 156/277; 428/204; 428/487; 428/488; 428/526; 428/530; 428/537
[58] Field of Search ............... 428/526, 537, 530, 531, 428/488, 487, 203, 204, 165, 172; 156/222, 221, 245; 430/109, 110

[56] References Cited

U.S. PATENT DOCUMENTS

| | | | |
|---|---|---|---|
| 2,646,380 | 7/1953 | Barlow et al. | 156/224 |
| 3,294,622 | 12/1966 | Wark | 156/222 |
| 3,698,978 | 10/1972 | McQuade | 156/221 |
| 4,060,450 | 11/1977 | Palazzolo et al. | 428/531 |
| 4,061,823 | 12/1977 | McCaskey et al. | 428/531 |
| 4,093,766 | 7/1978 | Scher et al. | 156/222 |

*Primary Examiner*—George F. Lesmes
*Assistant Examiner*—E. Rollins Buffalow
*Attorney, Agent, or Firm*—Dressler, Goldsmith, Shore, Sutker & Milnamow, Ltd.

[57] ABSTRACT

A decorated heat and pressure cured laminate, one of whose laminating sheets bears photoelectrographically applied indicia. The laminate at least also contains a thermosetting resin impregnated core adjacent to one surface of the photoelectrographic indicia bearing sheet. The laminate is cured at a temperature of about 300°–350° F. and at a pressure of about 1800–2000 p.s.i.

10 Claims, 2 Drawing Figures

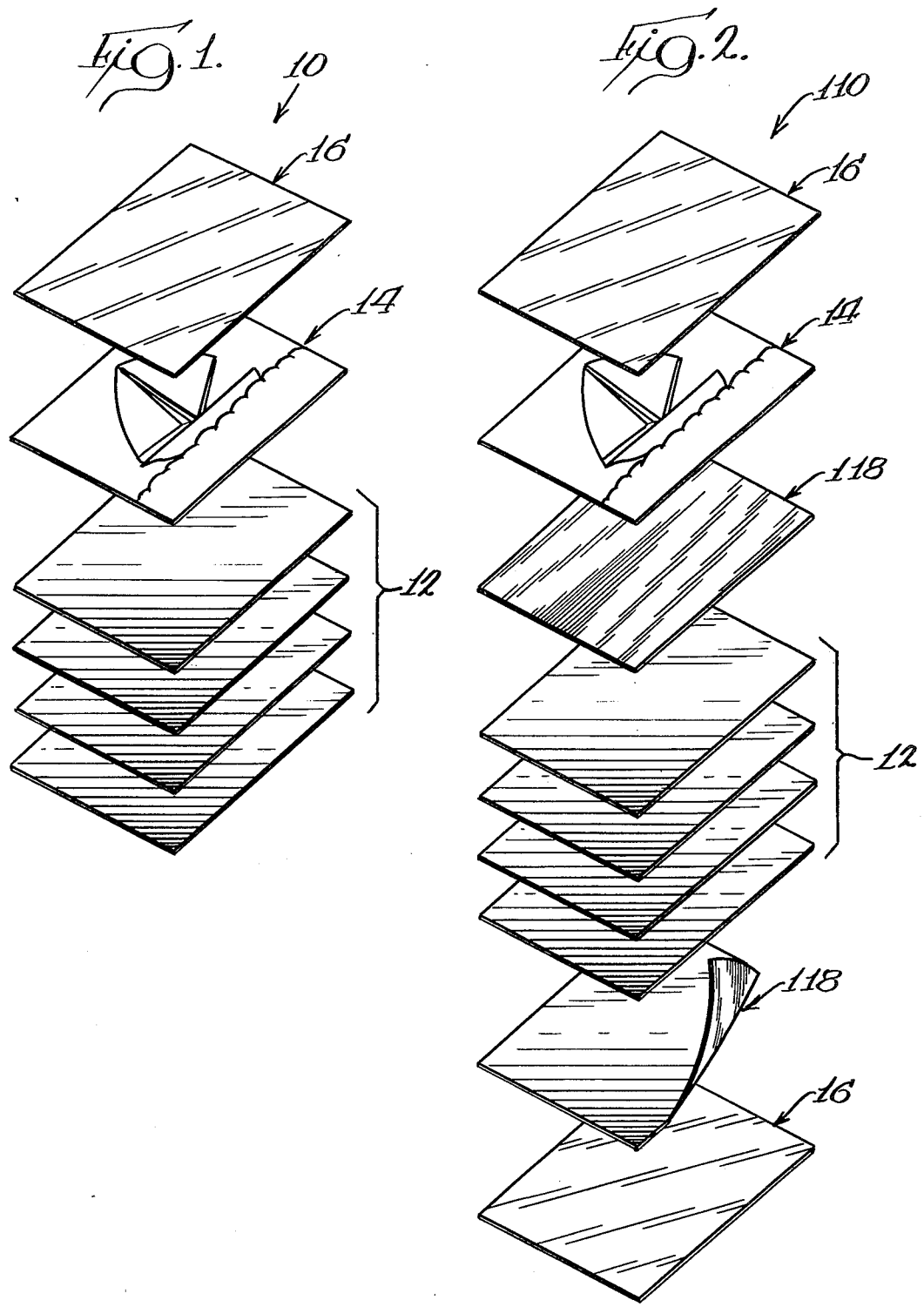

DECORATED LAMINATE HAVING INDICIA APPLIED PHOTOELECTROGRAPHICALLY AND METHOD OF MAKING SAME

DESCRIPTION

1. Technical Field

The present invention relates to decorated laminates prepared from thermosetting resin impregnated materials, and particularly to decorated laminates having indicia applied photoelectrographically.

2. Background Art

Heat and pressure cured decorated laminates are per se old in the art, having been prepared for more than about fifty years. The decorative portion of these laminates is generally prepared by printing the desired decoration on a sheet of paper using methods such as offset lithography, letter press or handprinting, and this is so taught in U.S. Pat. No. 2,646,380. Similarly, U.S. Pat. No. 2,184,121 teaches that art works on paper such as etchings, posters, photos, offset lithographically produced pictures and the like may be used as the decorative portion of the decorative laminate.

U.S. Pat. No. 3,421,967 teaches that both oil and water based inks may be used to print designs, and that while oil based inks are most commonly used, they show the greatest tendency to blister because they generally contain film-forming agents. It is additionally taught that water based inks also cause blister problems in heavily inked areas and/or where film forming agents are used. This latter patent avoids the formation of blisters by the insertion of a resin-free, absorbent paper between the decorated sheet and a preformed, core portion prior to the final molding step.

Aside from the problems of blistering, all of the above decorated laminates, except those of the U.S. Pat. No. 2,184,121 which may use originals as well as copies, suffer from the fact that to be produced economically, the laminates must be prepared from decorated layers which are produced in quantities of several hundred to several thousand copy sheets at a time. That is, the decorated sheets are prepared from a printing master sheet or plate. It thus only becomes economically feasible to produce the decorated laminates of the prior art in large quantities so that the cost of producing the master sheet or plate may be amortized over the whole production run of laminates.

DESCRIPTION OF THE INVENTION

This invention relates to decorated laminates having indicia which are applied to one of the sheets making up the laminate by a photoelectrographic process. Thus, the decorated, heat and pressure cured laminate may contain, before curing, (1) a core impregnated throughout with a thermosetting resin; and (2) at least one paper sheet selected from paper having a basis weight of about 20 to about 100 pounds bearing indicia applied to at least one surface photoelectrographically. After cure, the laminate is unitary.

According to the method of this invention, the above mentioned core impregnated throughout with the thermosetting resin is provided and thereafter at least one paper sheet bearing the photoelectrographically applied indicia is added to one side or the other of the core. The thereby produced assembly is then hot pressed and cured to form a cured, unitary laminate, and then the cured laminate is cooled.

One advantage of the present invention is that from one to several hundred decorative laminates may be economically produced without having to make a usual master sheet or plate for the decorative portion or indicia.

Another advantage of the present invention is that minimal blistering is observed when standard, commercially available photoelectrographic inks are used.

Still another advantage of the present invention is that colored as well as black and white indicia bearing laminates may be produced at about the same cost.

BRIEF DESCRIPTION OF THE DRAWINGS

In the accompanying drawings forming part of the specification:

FIG. 1 is an exploded, perspective view of one embodiment of the laminate of this invention; and FIG. 2 is an exploded, perspective view of another embodiment of this invention.

DETAILED DESCRIPTION OF THE INVENTION

While this invention is susceptible of embodiment in many different forms, there are shown in the drawings and will be herein described in detail, preferred embodiments of the invention. It should be understood, however, that the present disclosure is to be considered as an exemplification of the principles of the invention and is not intended to limit the invention to the embodiments illustrated.

In the following description, two digit numerals are used to refer to the embodiment illustrated in FIG. 1 and to those elements of the embodiment of FIG. 2 which are the same or functionally equivalent to those of FIG. 1. Three digit numerals in the 100 series are used to refer to elements in the embodiment illustrated in FIG. 2, which are not present in the embodiment of FIG. 1.

According to the present invention, decorated laminates are produced which have visible indicia applied to at least one of the laminate comprising sheets, which indicia are formed photoelectrographically. The photoelectrographical process is otherwise known as the xerographic process and is commonly used in so-called "plain paper" copying machines. The details of the photoelectrographic, or xerographic process are well-known in the art and will not be dealt with in depth herein. However, what is important about the photoelectrographic process is that we have found that the indicia so formed are useful in preparing decorated laminates in that they are stable and compatible with thermosetting resins used to form decorated, heat and pressure cured laminates.

Photoelectrographically produced indicia, once they have been produced, and ejected from the machine, are affixed to the paper on which they are applied by means of a thermoplastic film forming resin. The art teaches that one or more thermoplastic film forming resins, such as polyethylene, polypropylene, polybutadiene, polystyrene, copolystyrene-butylmethacrylate, polyamides, polyesters, polyurethanes, polypeptides, polycarbonates and the like may be used as the fixing, thermoplastic resin which adheres the photoelectrographically produced image to the paper.

It was unexpected that the thermoplastic film forming resins of photoelectrographic reproduction and the thermosetting resins used in the production of decorated laminates would be compatible when heated together under pressure. In this regard above-mentioned U.S. Pat. No. 3,421,967 teaches that designs (or indicia) printed using film forming agents cause blistering in the decorated laminates. Indeed, we have found that when photoelectrographically produced indicia are used in conjunction with some polyester and epoxy resins, some blistering of the surface does occur, presumably because of the incompatibility of those resins and the film forming resin of the photoelectrographically produced indicia.

It was also unexpected that the indicia formed photoelectrographically would not adversely melt or spread under the heat and pressure used in the production of decorative laminates. In this regard U.S. Pat. No. 3,609,082 teaches that the resins used for photoelectrographic reproduction may have melting points of at least 110° F. while the temperatures used in production of decorative laminates is preferably between about 300° and about 350° F.

As is also well-known in the art, photoelectrographic indicia may be produced not only in black, but also in colors other than black. Preferably, the photoelectrographically produced indicia of the present invention are formed in colors other than black. Rather, the most preferred indicia are formed in at least the colors of magenta, cyan and yellow, as are commonly used to make three-color reproductions.

It has been found that any image which can be reproduced photoelectrographically, can be utilized as the indicia of a heat and pressure cured decorated laminate of this invention. Thus, writing on a piece of paper, a picture from a magazine, or a slide projected onto a copying machine have all served as substrates for the production of photoelectrographically produced indicia which were then used in heat and pressure cured decorated laminates.

While the scope of this invention includes unitary, decorated laminates of potentially any size, this invention's principal utility has been found to lie in the manufacture of relatively small articles, each finished article having its largest surface face of about 2 feet by 3 feet. More preferably, the articles of this invention are plaques, food carrying trays, table ware such as dishes and saucers and the like, which are made in relatively small production runs of about 1 to several hundred articles bearing identical indicia.

The paper used for producing the photoelectrographic image may be any paper which is acceptable for use in a photoelectrographic copying machine. We have found, that paper in the weight range of about 20–100 pounds per 3,000 square feet (20–100 pound basis weight) is useful herein. Furthermore, within this broad range of useful paper weights, paper in two weight ranges is particularly useful for making the decorated laminates of this invention.

Thus, we have found that paper having a basis weight of about 20–40 pounds; i.e., which weighs about 20 to about 40 pounds per 3,000 square feet, and which, after impregnation with a thermosetting resin as described hereinbelow and cured, is substantially transparent after curing is useful. An example of such a paper is that which is sold by the Kimberly-Clark Corporation under the designation BP 209. This paper weighs about 30 pounds per 3,000 sq. ft. and is an alpha-cellulose paper, as is preferred.

Paper in the second weight range weighs about 60 to about 100 pounds per 3000 sq.ft. (60–100 pounds basis weight). It more preferably has a basis weight of about 60 to about 80 pounds, and is substantially opaque after curing. This paper is preferably also made from alpha-cellulose. An example of this second preferred paper is that denominated White Background Paper made by Sorg, Inc. having a weight of about 65 pounds per 3000 sq. ft.

The lighter weight paper is generally used when it is desirable to have another color or decoration show up as a background for the photoelectrographically applied indicia. The heavier weight, substantially opaque paper is generally utilized when the whole surface of the indicia bearing paper is to be covered by the photoelectrographically applied indicia, or when it is desirable to have a white background for the photoelectrographically produced indicia. Papers having basis weights of about 40 to about 60 pounds display increasing opacity with increasing weight on cure, and are useful where less background printing is desired to be seen than when the lighter weight papers are used, but substantial opacity is not desired.

The paper sheet having the photoelectrographically applied indicia normally, and in preferred practice, is not impregnated with any resin. However, in some embodiments of the present invention, the photoelectrographic indicia bearing paper may be impregnated with a thermosetting resin.

In addition to the indicia bearing sheet, the laminates of this invention also contain a core and usually also contain at least one overlay sheet and at least one printed sheet.

The core imparts rigidity or support to the laminate. In preferred practice, the core is comprised of a plurality of paper sheets, and these sheets preferably consist of kraft paper, uncreped or creped, or in mixtures, although cotton linters paper, or cotton or linen cloth may also be used. The sheets making up the core generally range in thickness from about 0.001 to about 0.025 inch and preferably from about 0.002 to about 0.015 inch. The preferred kraft paper core sheets have a basis weight of about 30 to about 150 pounds; i.e., contain about 30 to about 150 pounds of paper per 3000 square feet. A plurality of core sheets is used in the laminates of this invention, and generally about 10 to about 30 such core sheets are used.

Laminates may also be formed from fewer than 10 core sheets. In these embodiments, rigidity may be imparted by including a rigid preformed member such as a wood or metal sheet or ring, or a laminate made similarly to those described herein into the laminate structure. Additionally, the laminates of this invention may be affixed to a rigid member, as by gluing, after the laminate is cured. While a plurality of core sheets is used in these embodiments, as few as about 2 core on up to about 30 core sheets may be used.

In yet another embodiment, the core may be a preformed unit made of wood chips or pulp, recycled newsprint, cotton linters or the like which adhere together sufficiently to hold a shape. When such a preform is used, it is also impregnated throughout with a thermosetting resin as is discussed hereinafter.

Overlay sheets are usually used in the products of this invention and preferably consist of high grade regenerated or alpha-cellulose. These sheets range in thickness from about 0.001 to about 0.015 inch, and preferably from about 0.001 to about 0.010 inch. Typical, preferred overlay sheets have a 20 to about 40 pounds basis weight and the lower weight range paper used for the indicia bearing sheets is preferably used as the overlay sheet. A single overlay sheet is normally used in the decorated laminates of this invention at each position in the laminate at which an overlay sheet is called for. However, it is contemplated that more than one overlay sheet may be provided at each position, as where rough usage of the product is intended and such usage might injure the indicia.

A printed sheet may also be used in the decorated laminates of this invention. This paper may have a basis weight of about 20 to about 100 pounds or weigh about 20 to about 100 pounds per 3000 sq. ft. In preferred practice, this paper has a basis weight of about 50 to about 90 pounds and is usually made from alpha-cellulose.

The printed sheet is the sheet which usually bears the background decoration for the photoelectrographically produced indicia, and is usually printed by a technique such as offset lithography or a silk screen process in hundreds to thousands of copies per printing run. These sheets may be printed in a solid color or in a desired pattern, such as wood grain, as is known in the art. A single layer of printed sheet is normally used at each place in the laminate at which a printed sheet is called for, and after curing, the printed sheets are substantially opaque.

The core, overlay and printed sheets are all impregnated throughout with a thermosetting resin. The resins used herein are those commonly used in the industry for decorated laminates. These resins include melamine-formaldehyde resin, and substituted melamine-formaldehyde resins such as bezoguanamine formaldehyde resin, phenol and substituted phenol such as cresol-formaldehyde resins urea and substituted urea-formaldehyde resins as well as phenolic rubbers, epoxy, silicone and acrylic resins. The melamine and substituted melamine-formaldehyde resins are termed herein melamine resins, the phenol and substituted phenolformaldehyde resins are termed herein phenolic resins. While above resin types may each be used for each of the core, overlay and printed sheets, it is preferred that phenolic resins be used for the core and melamine resins be used for the printed and overlay sheets. This preference is based upon cosmetic, cost and durability factors.

The core (whether sheets or preform) normally contains about 30-35% of its final "dry" weight of the phenolic resin which normally has about a 6-7% by weight volatile content and a flow of about 4-6%. About 60-65% by "dry" weight of the overlay sheet is attributable to the melamine resin which has a volatile content of about 8-10% by weight. The "dry" printed sheet normally contains about 50-55% by weight melamine resin having about a 10-12% volatile content, the resin being applied after printing. The indicia bearing sheet normally contains no resin, although melamine or other resin may be applied after application of the photoelectrographic indicia.

Methods of applying the resins to the various laminate layers are known in the art, and will not be dealt with herein. After application of the resin, the resin is dispersed throughout the layers and they are "dried" to the volatile contents stated hereinabove. Thus, since the layers retain volatiles, they are not absolutely dry, although they appear dry and are usually not tacky or damp to the touch.

In an embodiment of this invention shown in FIG. 1 and generally indicated by the numeral 10, the unitary laminate is prepared from a plurality of phenolic resin impregnated core sheets 12, a photoelectrographically produced indicia bearing sheet 14, and a melamine resin impregnated overlay sheet 16, which sheets are arranged in the laminate, in the superimposed arrangement shown in the figure. Thus, in the embodiment of FIG. 1, the indicia bearing sheet comprises the only decoration of the laminate.

When preparing the above laminate, the individual layers (sheets, cloth, preform, or the like) are stacked one upon the other to form a pile, which, when all of the layers sufficient to form a laminate of desired thickness and rigidity are in place, is called an assembly. After formation of the assembly, it is preferably preheated in an oven, and then, in preferred practice, pressed at about 1800-2000 p.s.i. at a temperature of about 300°-350° F. for about 5 minutes, to form a unitary, photoelectrographic indicia bearing laminate which is then cooled, as is known in the art. Preferably, the edges of the cooled laminate are then trimmed to a smooth finish. By "unitary" it is meant herein that during the cure, the various layers become fused to one another so that after cure, the laminated product may not readily be separated into its constituent layers.

In another embodiment, shown in FIG. 2, and generally indicated by the numeral 110, the laminate is prepared (going from the top of FIG. 2 to the bottom) from a first melamine resin impregnated overlay sheet 16, a photoelectrographically applied indicia bearing sheet 14, a first melamine impregnated printed sheet 118, having the printing on the surface facing the first overlay and indicia bearing sheet (away from the core), a plurality of phenolic resin impregnated kraft paper core sheets 12, a second melamine resin impregnated printed sheet 118 having the printing on the surface facing the second overlay (away from the core), and a second melamine resin impregnated overlay sheet 16. This laminate is prepared and finished as discussed above.

In another embodiment of the present invention, the unitary decorated laminate is formed from a pile of only two types of layers. The first layer being a plurality of phenolic resin impregnated kraft paper core sheets 12. The assembly is made by placing the paper sheet bearing the photoelectrographically produced indicia 14 on top or bottom of the core. In this embodiment, the latter sheet 14 may be impregnated with a thermosetting melamine resin. After forming this assembly of layers, the assembly is then pressed and heat cured as discussed above to form a cured, unitary laminate. The cured laminate is then cooled, and under most circumstances the edges thereof are trimmed to produce the finished product, as hereinbefore discussed.

When forming the immediately hereinabove mentioned assembly, the indicia bearing sheet preferably is prepared from the lighter weight, 20 to about 40 pounds basis weight paper, and the indicia bearing surface of the paper is placed adjacent to the core sheets prior to heat and pressure curing. Use of this arrangement and paper weight, allows for the indicia to be on the inside of the cured laminate and therefore less susceptible to scratching or other impairment. Additionally, by using the lower weight paper, the photoelectrographically produced indicia may be seen through the substantially transparent cured sheet. Such an arrangement may obviate the need for a separate protective overlay sheet, as is described above in connection with the embodiments of FIGS. 1 and 2.

Of course, a beforementioned, preformed core could be used to replace the plurality of core sheets 12 in any of the above embodiments.

By "substantially transparent," it is meant herein that while the image seen through the "substantially transparent" laminated sheet does not have the clarity that one might see viewing a similar indicia through the air only, the clarity of the indicia is only diminished by approximately the amount as when one would look through several sheets window glass. The phrase "substantially opaque" as used herein, is meant to indicate that little, if any, color from an underlying layer is seen through a "substantially opaque" sheet in the laminate.

It is, of course, possible to photoelectrographically apply indicia to both sides of one indicia bearing sheet 14 so that both indicia are visible in the completed laminate. Some difficulty is noted when both applied indicia are other than black in color because the indicia applied on the first side frequently tends to melt and lose clarity when the second indicia are applied. When one set of indicia are black and the other in colors other than, or including black, this problem may be solved by applying the black indicia first, followed by the colored indicia on the other side of the sheet.

Similarly, one may prepare a laminate having an indicia bearing sheet 14 between two printed sheets 118, one of which printed sheets forms the background color for one side of the laminate, while the second printed sheet provides a general type of frequently used design which may be used with several types of more individualized indicia on the sheet therebetween. In this embodiment, the first printed sheet 118 would be adjacent to the core and substantially opaque after cure, while the second printed sheet 118 would be physically nearer the viewer and would be substantially transparent after cure.

Indicia may also be photoelectrographically applied to what would otherwise be an overlay sheet 16 which may be used in addition to the indicia bearing sheet 14. It is also within the ambit of this invention to use photoelectrographically produced indicia bearing sheets 14 on each side of the laminate.

It is desired to point out that the indicia bearing sheet need not have the same dimensions as the other sheets in the pre-cured pile, and in many instances is much smaller than the dimensions of the finished article. Additionally, two or more different indicia bearing sheets or an indicia bearing sheet and another sheet may be used to constitute a single layer of the laminate. Possible differences in thickness of the cured laminate or areas thereof due to the use of an indicia bearing sheet which is smaller than the surface area of the finished article or where two different sheets are used to comprise part or all of one laminate layer are generally so small that they cannot be felt when one runs a finger across an area known to be so prepared.

The above-mentioned examples of possible arrangements of the various sheets are listed for purposes of illustration and are not intended to be limiting.

We claim:

1. A decorated, heat and pressure cured, unitary laminate comprising before said cure and in the arrangement recited;
   (a) a first paper overlay sheet having a basis weight of about 20–40 pounds and impregnated throughout with a thermosetting melamine resin;
   (b) a first printed paper sheet having a basis weight of about 50 to about 90 pounds, the printing thereon facing said first overlay sheet, said paper being impregnated throughout with a thermosetting melamine resin;
   (c) a plurality of kraft paper core sheets impregnated throughout with a thermosetting phenolic resin;
   (d) a second printed paper sheet having a basis weight of about 50 to about 90 pounds, the printing thereon facing away from said core sheets, said paper being impregnated throughout with a thermosetting melamine resin;
   (e) a paper sheet bearing indicia photoelectrographically applied to at least one surface thereof by a film forming thermoplastic resin, said sheet being selected from paper having basis weight of about 20 to about 40 pounds and about 60 to about 80 pounds; and
   (f) a second overlay paper sheet having a basis weight of about 20 to about 40 pounds and impregnated throughout with a thermosetting melamine resin,
   said first and second overlay sheets being substantially transparent after said cure and said first and second printed sheets being substantially opaque after said cure.

2. The decorated heat and pressure cured laminate of claim 1 wherein said indicia bearing paper sheet bears photoelectrographically applied indicia on two surfaces.

3. The decorated heat and pressure cured laminate of claim 1 wherein at least one of said overlay sheets bears photoelectrographically applied indicia on at least one surface.

4. The decorated heat and pressure cured laminate of claim 1 wherein said photoelectrographically applied indicia are colored other than black.

5. A decorated, heat and pressure cured laminate, said laminate comprising before said cure,
   (a) a core impregnated throughout with a thermosetting phenolic resin; and
   (b) at least one sheet selected from paper having basis weights of about 20 to about 100 pounds, said paper bearing photoelectrographically indicia on at least one surface thereof applied by a film forming thermoplastic resin,
   said laminate being unitary after cure.

6. The decorated, heat and pressure cured laminate of claim 5 wherein prior to cure said laminate additionally comprises an overlay paper sheet having a basis weight of about 20 to about 40 pounds, said overlay sheet being impregnated throughout with a thermosetting melamine resin, and being substantially transparent after curing.

7. The decorated, heat and pressure cured laminate of claim 6 wherein prior to cure, said core is comprised of a plurality of kraft paper core sheets.

8. The decorated, heat and pressure cured laminate of claim 7 additionally comprising a second overlay paper sheet adjacent said core sheets and opposite said first mentioned overlay sheet, said second overlay having a basis weight of about 20 to about 40 pounds and being impregnated throughout with a thermosetting melamine resin, said second overlay sheet being substantially transparent after cure.

9. The decorated, heat and pressure cured laminate of claim 8 additionally comprising first and second printed paper sheets having a basis weight of about 50 to about 90 pounds and impregnated throughout with a thermosetting melamine resin, said first printed sheet being located between said core sheets and said indicia bearing sheet, the printing thereon facing said indicia bearing sheet, and said second printed sheet being located between said second overlay sheet and said core sheets, the printing thereon facing said second overlay sheet.

10. The decorated, heat and pressure cured laminate of claim 9, wherein said photoelectrographically applied indicia are colored other than black.

* * * * *